Oct. 31, 1939.  A. C. S. VAN HEEL  2,178,057
SYSTEM OF LENSES
Filed Nov. 18, 1936
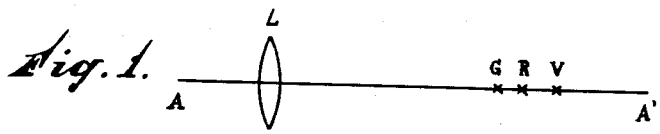
Fig. 1.
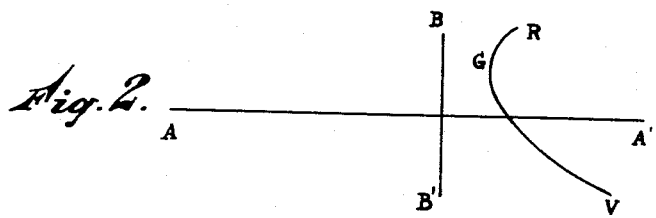
Fig. 2.
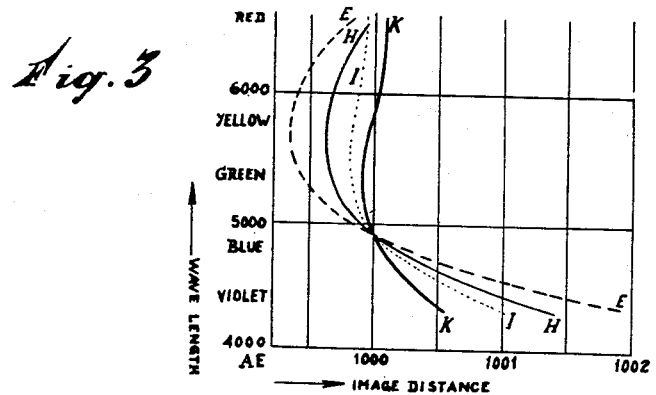
Fig. 3
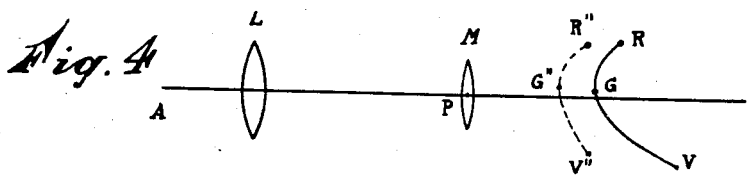
Fig. 4
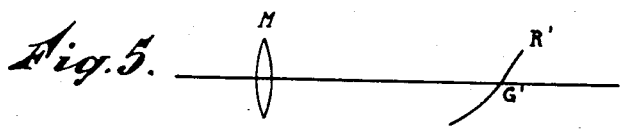
Fig. 5.
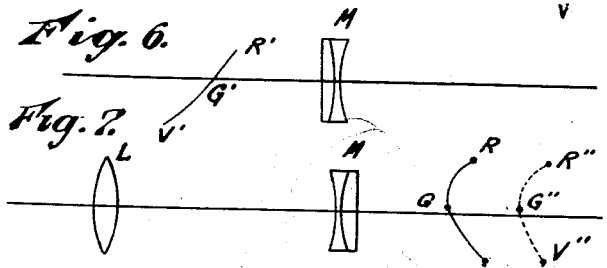
Fig. 6.
Fig. 7.
Inventor:
A. C. S. van Heel
By E. F. Wenderoth
atty

UNITED STATES PATENT OFFICE 2,178,057

SYSTEM OF LENSES

Abraham Cornelis Sebastien van Heel, Delft, Netherlands, assignor to Associated Acoustics N. V., The Hague, Netherlands, a corporation of the Netherlands Application November 18, 1936, Serial No. 111,546

1 Claim. (Cl. 88—57)

The invention relates to improvements in the action of lenses more particularly in the action of objects for, e. g., telescopes, microscopes and photographic objectives and provides a means by which the qualities of objectives may be so much improved as to be equal to those of far more expensive ones and may even excel them.

The improvements more particularly relate to the so-called chromatic aberration caused by the differences in refraction of glass for light of different wave lengths, because of which rays of different colors have a different focus and which aberration, e. g., with the so-called achromatic systems of lenses is only obviated in part.

Fig. 1 gives the common chromatic axial aberration for a positive achromatic lens L (the so-called secondary spectrum), with the image points GRV for yellow green for red and for violet radiations respectively, lying on the axis of the lens.

Fig. 2 gives a graphical representation of this same secondary spectrum on two axes AA' and BB', the last being drawn perpendicularly to the lens axis AA' in an arbitrary well chosen point of AA'. BB' is the axis of wave lengths. The image distance for each wave length is plotted against the wave length.

Fig. 3 gives the curves of the secondary spectrum for telescope objectives.

Fig. 4 relates to an achromatic lens system L, whose secondary spectrum RGV has been represented in the usual way.

Fig. 5 illustrates the chromatical aberration of the under corrected lens M itself, its foci for the red, yellow green and violet being indicated by the points R', G' and V' respectively.

Fig. 6 relates to another form of the new invention. It gives an embodiment of the corrector system M that is negative and chromatically overcorrected. The foci are represented by the curve R'G'V'.

Fig. 7 illustrates the effect of the interposition of the system illustrated in Fig. 6, between the achromat L and its image points RGV.

The invention will be further illustrated by the accompanying Figures 1, 2 and 3, in which Fig. 1 explains the chromatic aberration of a so-called achromatic system, Fig. 2 indicates the dispersion curve for such a system and Fig. 3 represents a number of curves for so-called achromatic combinations of various kinds of glass.

In the achromatic systems of lenses the focus for the different colors of the spectrum is not the same: instead of one image point there is formed a series of image points, which series is called the secondary spectrum.

The order of these points always is the one indicated in Fig. 1.

In this figure L denotes the projecting lens of which AA' represents the optical axis. In this figure as well as in all the others, the light is supposed to strike the lens from the left hand side. If the spectrum is viewed from red to violet, the image point will go through a series of axis points RGV in the sequence as indicated in Fig. 1.

For greater clearness this is generally graphically represented as follows (vide Fig. 2): perpendicularly to the optical axis AA' there is drawn through any optional point of the same a second axis BB' on which the wave lengths occurring in the spectrum are indicated. The image distance belonging to each wave length is graphically indicated on the two axes AA' and BB'. The curve thus obtained for achromates will always have the form RGV of Fig. 2, of which R, G and V are the points belonging to the wave lengths respectively situated in the red, yellow-green and violet parts of the spectrum.

For telescope objectives the size of this aberration is illustrated in Fig. 3, curve EE.

By using special kinds of glass the partial dispersions of which better correspond to the proportion, Abbe was the first to succeed in making systems of lenses with a reduced secondary spectrum, of the kind the aberration curves of which are denoted by HH' and II' in Fig. 3.

By using more than two lenses for the system, it is possible to obtain an "apochromate" the aberration curve of which has the form KK in Fig. 3.

For objectives for microscopes which cannot be considered as "thin systems" any more the above simple expositions will not hold good; reliable data with regard to the construction of and the exact path of the rays in the existing good objectives for microscopes are not to be found in the literature on this subject, as has been ascertained by extensive checking up of the published available data. By measuring a series of representative objectives, such as A or 8, AA or 10, D or 40, F or 60, 1/12 or 90 of Carl Zeiss, it has, however, been ascertained that the curve of the chromatic aberrations is absolutely the same as sketched above.

For photographic objectives also (vide, e. g., von Rohr in Volume I of the "Handbuch der wissenschaftlichen und angewandten Photographie", 1932) the curve is entirely the same.

The present invention relates to the reduction of the secondary spectrum of the existing achromatic and apochromatic systems by means of a system of lenses comprising one or more lenses which system is situated at a relatively large distance of the system to be improved, between the said system and the image. This lens may either be positive or negative or may have the strength zero for one or more colors, in the first mentioned case it must be chromatically under-corrected and in the second case chromatically over-corrected, and in the third case one of these two dependently on the wave-lengths of which the strength is zero. The most favorable area for placing the lens is between two points located respectively at 0.4 and at 0.9 of the distance between the lens and the focussing area of the rays.

The focal distance of the additional or correcting lens may be taken between wide limits. The lens must be the stronger, the nearer it is placed to the focus; the focal distance, however, is always greater than that of the objective, at least 3 times as great. In certain cases the focal distance may be 10 times as great.

In a microscope the correcting lens of the objective used is preferably screwed into the lower end of the extensible tubus, which in all commercial microscopes is provided with screw threading into which an objective will fit also. Thereby the distance between the objective and the correcting lens may be adjusted at will.

The invention will now be further explained with the aid of Figs. 4–7 illustrating the effect obtained by means of the correcting lens according to the invention.

If in Fig. 4 the system to be corrected is denoted by L, while RGV represents the secondary spectrum if the said system was used alone, it is possible to arrange in a point P of the axis at a relatively large distance from L a system M with one of the embodiments of the correcting lens which is either positive and chromatically under-corrected, or negative and chromatically over-corrected.

In the first case, i. e., that of a positive, chromatically under-corrected system, the curve of the focuses of the system M will be the one indicated in Fig. 5. The series of image points RGV of L in Fig. 4 is projected by the said system M in points R″ G″ V″ which are closer to M than RGV. The distance R″R is smaller than G″G and this distance again is smaller than V″V.

This may also be directly understood in the following manner: RGV is a series of virtual object points for M; they are projected by M in a series of real image points R″ G″ V″. These image points will be brought closer to M in direct ratio to the strength of M (i. e., proportionally to passing from red towards violet).

R″ with regard to G″ is now further removed from L, whereas V″ now is nearer to L. The difference between the greatest and the smallest distance of these points from L has been reduced, since the asymmetry of the curve R″ G″ V″ is less than that of RGV.

Consequently the secondary spectrum has been reduced. This effect is produced with achromatic as well as with apochromatic systems and it has been possible to ascertain this by careful calculation as well as by experiments.

In the case of a negative and chromatically over-corrected system M the curve of the focuses will be the one illustrated in Fig. 6. The image points RGV of the system to be corrected L (vide Fig. 7) will now all be further away from L, in such a way, however, that RR″ is greater than GG″ and GG″ is greater again than VV″. In this manner also the secondary spectrum of L has been reduced by reducing the asymmetry of the curve for the secondary spectrum. The color correction of achromatic systems is improved in this manner to a so-called apochromatic correction, that of apochromatic systems is still considerably further improved. By means of different intermediate systems it was possible to obtain a reduction on the total length of the secondary spectrum down to 50% and some times even considerably less, of the original values.

By an appropriate choice of material, strength of lenses and location of the system M one may not only obtain this chromatic-aberration improving effect, but it is also possible to prevent noxious spheric or other aberrations.

With regard to the location and the strength of the correcting system M the following is to be observed:

If the distance between the system to be corrected L and the image points formed by this system is denoted by $d$, there will be in this value $d$ a certain amount of play owing to the secondary spectrum, which play, however, will be neglected when indicating the distance from M.

The smaller the distance between M and L, the less the strength will have to be on the other hand, the greater the distance between M and L, the greater the strength may be. In the first case the influence of M upon the spherical aberration will be greater, in the second case it will be less.

If M, however, is located at a distance from L which is less than 0.3 $d$, the color improving action of M will only be slight. If on the other hand M is located at a distance from L which is greater than 0.95 $d$, the color improving effect likewise will be only slight.

The most favorable location is between 0.5 $d$ and 0.8 $d$ from L. The average focal distance of M is to be more than 3 $d$, if the color improving effect is to be readily perceptible. If this focal distance is more than 10 $d$, the effect will also be only slight. The most favorable focal distance for M lies between these two values.

The systems corrected in the manner indicated above after correction will still have approximately the same apertures and the same focal distances; differences of 10% may occur, but said differences need not be greater than 10%, whereas the complete color improving action is still obtained.

A lens system is always a compromise between different requirements. Special aberrations may be eliminated, but it is always necessary to admit a certain degree of all or almost all aberrations in order to obtain a definite desired effect. It is never possible to give an exact entirely unambiguous form. One is trying to find an optimum.

In Figure 2, curve RGV gives the general character of the secondary spectrum of common achromats. R, G and V are the points corresponding to wave lengths respectively situated in the red, yellow, green and violet parts of the spectrum.

With regard to the showing in Figure 3 the following comments are made. In horizontal direction the image distance (along the axis AA′ of Fig. 2) is given. The number 1000 indicates the "mean" or "overall" value of the image distance. The number 1001 indicates an image distance one thousandth part larger. The number 1002 indicates an image distance two thousandth parts larger, and so on. The curves given are reproductions of well known established types of telescope object glasses. EE relates to common achromats. HH and II relate to systems with glass types, whose partial relative dispersion is proportional. KK relates to a so-called apochromat.

In Figure 4 a positive chromatically undercorrected system has been interposed between the lens L and its row of images RGV. This new element M is an example of the new invention.

Its focal length is several times larger than the distance PG between M and the image originally formed by L. The images formed by the combination of L and M in this position are R'' G'' V'', lying closer to M than the images RGV, originally formed by L alone. As the power of M, by virtue of its being chromatically undercorrected, increases from red to yellow, green to violet, the displacements RR'', and GG'' and VV'' also are increasing in this order.

An elaborate form of the system shown in Figure 6.

In Figure 7, the focal length of M is several times larger than the distance from M to G. The images formed by the combination of L and M in this position are R'' G'' V'', farther away from M than the images RGV, originally formed by L alone. As the power of M, by virtue of its being chromatically overcorrected, decreases from the red to the yellow green to the violet, the displacements RR'', GG'' and VV'' also are decreasing in this order.

From the above it may appear that by this invention for reducing chromatic aberrations a path has been taken that is entirely different from those hitherto followed.

I claim:

System of lenses for the reduction of the secondary spectrum, which is used in combination with a normal objective, which has a focal length of at least three times the focal length of the said normal objective and not more than ten times the distance between the said normal objective and its image, which is situated between the said normal objective and its image at a distance from the said normal objective amounting to at least four tenths and not more than nine tenths the distance of the normal objective and its image, and whose axial chromatical aberration is such that the focal length for 4340 AU and that for 5893 AU show a difference of 3 to 30 per cent of the mean focal length.

ABRAHAM CORNELIS SEBASTIEN VAN HEEL.